April 15, 1924.

J. E. GLICKERT

COILED MANDREL

Filed Jan. 18, 1923

1,490,698

Inventor
JOHN E. GLICKERT
By his Attorney
Ernest Hopkinson.

Patented Apr. 15, 1924.

1,490,698

UNITED STATES PATENT OFFICE.

JOHN E. GLICKERT, OF INDIANAPOLIS, INDIANA, ASSIGNOR TO G & J TIRE COMPANY, OF INDIANAPOLIS, INDIANA, A CORPORATION OF INDIANA.

COILED MANDREL.

Application filed January 18, 1923. Serial No. 613,331.

*To all whom it may concern:*

Be it known that I, JOHN E. GLICKERT, a citizen of the United States, residing at Indianapolis, county of Marion, and State of Indiana, have invented a certain new and useful Coiled Mandrel, of which the following is a full, clear, and exact description.

This invention relates to apparatus for use in the manufacture of hollow rubber articles, such as inner tubes, and more particularly, to a coiled mandrel, or curved pole, for curing them approximately in service-shape.

Inner tubes for large sized truck casings if cured in straight lengths are liable to be buckled after splicing their ends, and, when mounted in a casing, to become pinched, or injuriously folded, round their inner periphery adjacent the rim. Consequently, it is desirable to cure tubes of large size in more nearly service-shape. This invention aims to provide a curved mandrel, or form, which enables such large sized tubes to be satisfactorily manufactured. Especially, it aims to provide a mandrel that is self-draining, that facilitates mounting of the completely cured tubes thereon preliminary to its final or complete vulcanization, and that facilitates wrapping or taping the ends of the rubber tube.

An embodiment of the invention is illustrated in the accompanying drawings in which:—

Figure 1:
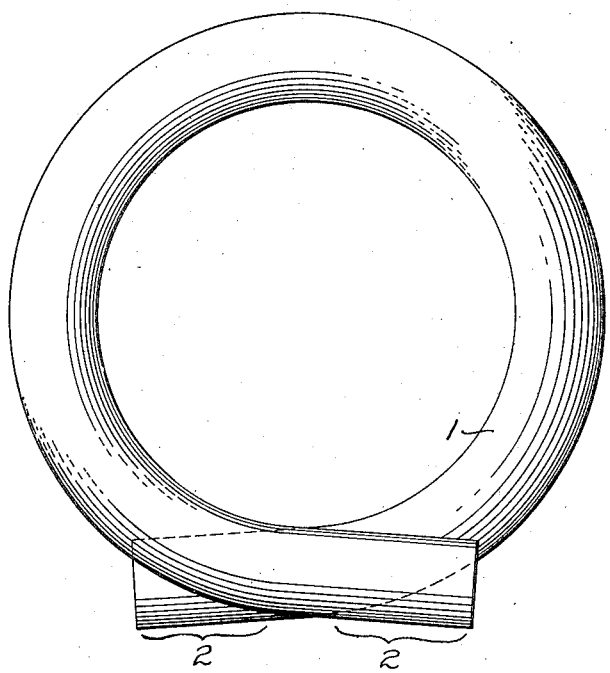
Fig. 1 is a front elevation of the spiral mandrel in an upright position as preferably positioned in a heater.
Figure 2:
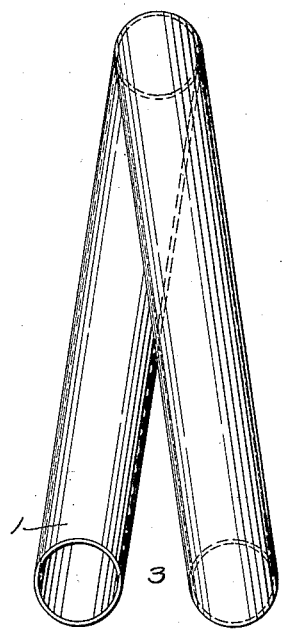
Fig. 2 is a side elevation of the same.
Figure 3:
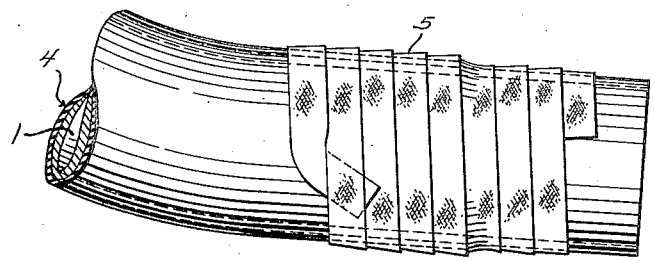

And Fig. 3 is a fragmentary elevation of an end of the mandrel, showing how the rubber composition is wrapped thereat.

As clearly shown in the drawings, the mandrel consists of a hollow metal tube 1 of approximately spiral form with its ends 2 overlapping and in spaced relation, as indicated at 3, these ends being straight for a short distance and inclined downwardly in opposite directions, thereby to permit any condensed steam to drain readily. No pockets of water can collect in the mandrel when it is supported upright in a vulcanizer during cure, and thus, uniform transmission of heat from the steam is not impaired. The straight ends 2 of the mandrel also facilitate mounting and removal of the green, or incompletely cured, tube 4 that is mounted thereon. The rubber composition, which is applied to the outside of the mandrel and reaches to a point immediately adjacent the extremities of the hollow metal tube, desirably has its ends only wrapped with tape 5 after being mounted on the mandrel. This wrapping operation is facilitated when the end portions of the mandrel are straight, it being, of course, easier to wind the tape in overlapping convolutions about the rubber on a straight hollow metal tube than on a curved extremity. By overlapping the ends of the mandrel, the diameter is kept within dimensions allowing it to be introduced in a vulcanizer or heater of a standard size and hence, not requiring new equipment.

In making these large size truck tubes, it is usual to partially cure them on straight poles, then to remove the semi-cured tube and mount it on a spiral mandrel, and then to tape the ends of the tube so as to bind them closely to the mandrel and exclude steam from entrance between the rubber and the mandrel. The spiral mandrel of the present invention is intended primarily for such manufacturing operations, but, of course, may be used in other processes, if desired.

It is, of course, to be understood that the invention is not limited to the exact details illustrated and described, and reference should therefore be made to the accompanying claims for an understanding of the scope of the invention.

Having thus described my invention, what I claim and desire to protect by Letters Patent is:—

1. A hollow curved metal mandrel having overlapping and substantially straight extremities adapted to drain.

2. A hollow curved metal mandrel having overlapping and straight extremities extending in opposite directions and divergently inclined downwardly.

3. A hollow curved metal mandrel having overlapping and straight extremities extending in opposite directions and divergently inclined downwardly in spaced apart relation to facilitate wrapping.

Signed at Indianapolis, county of Marion, and State of Indiana, this 15th day of January, 1923.

JOHN E. GLICKERT.